(12) United States Patent
Lee et al.

(10) Patent No.: US 8,421,511 B2
(45) Date of Patent: Apr. 16, 2013

(54) POWER CONVERTER AND PULSE WIDTH MODULATION SIGNAL CONTROLLING APPARATUS THEREOF

(75) Inventors: Li-Min Lee, Taipei County (TW); Shian-Sung Shiu, Taipei County (TW); Chung-Che Yu, Taipei County (TW); Ji-Ming Chen, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 413 days.

(21) Appl. No.: 12/909,838

(22) Filed: Oct. 22, 2010

(65) Prior Publication Data

US 2011/0279103 A1    Nov. 17, 2011

(30) Foreign Application Priority Data

May 17, 2010 (CN) .......................... 2010 1 0176359

(51) Int. Cl.
*H03K 7/08* (2006.01)

(52) U.S. Cl.
USPC .............................. 327/175; 323/282; 363/97

(58) Field of Classification Search .................. 323/222, 323/282, 351; 327/175; 363/21.1, 21.11, 363/21.18, 95, 97, 98
See application file for complete search history.

(56) References Cited

U.S. PATENT DOCUMENTS

| 7,965,151 | B2 * | 6/2011 | Liu et al. | 332/109 |
| 2011/0089986 | A1 * | 4/2011 | Wang | 327/175 |
| 2011/0279103 | A1 * | 11/2011 | Lee et al. | 323/282 |

* cited by examiner

*Primary Examiner* — Jeffrey Sterrett
(74) *Attorney, Agent, or Firm* — Jianq Chyun IP Office (57) ABSTRACT

A pulse width modulation signal controlling apparatus including a signal pin, a core circuit, a setting judging circuit, a signal adjusting and selecting circuit, and a timer circuit is disclosed. The signal pin is connected to a setting device for receiving an external input signal. The setting judging circuit receives and compares a setting signal with a reference value to generate a setting judgment result. The signal adjusting and selecting circuit couples the signal pin to the setting judging circuit and adjusts the external input signal into the setting signal according to the setting device in a first state, and couples the signal pin to the core circuit in a second state. The timer circuit controls the state of the signal adjusting and selecting circuit, wherein the timer circuit sets the signal adjusting and selecting circuit in the first state during a predetermined time period.

12 Claims, 7 Drawing Sheets

POWER CONVERTER AND PULSE WIDTH MODULATION SIGNAL CONTROLLING APPARATUS THEREOF

CROSS-REFERENCE TO RELATED APPLICATION

This application claims the priority benefit of China application serial no. 201010176359.6, filed on May 17, 2010. The entirety of the above-mentioned patent application is hereby incorporated by reference herein and made a part of this specification.

BACKGROUND OF THE INVENTION

1. Field of the Invention

The present invention generally relates to a power converter, and more particularly, to a pulse width modulation (PWM) signal controlling apparatus of a power converter.

2. Description of Related Art

Power converters have been provided for supplying different operation powers to different electronic products along with the diversification of today's electronic products. A power converter switches a power transistor switch according to a pulse width modulation (PWM) signal for achieving a power converting action.

A PWM signal is usually generated by a PWM signal controlling apparatus. Since a PWM signal controlling apparatus is usually implemented as an integrated circuit (IC), additional pins for receiving additional input signals have to be disposed in order to accomplish new functions in the PWM signal controlling apparatus. These additional pins of the PWM signal controlling apparatus take up a lot of surface area in the circuit layout of the IC and accordingly increase the circuit cost. In addition, with the increased number of pins, the packaging type of the integrated PWM signal controlling apparatus may have to be changed, and as a result, the circuit board carrying the PWM signal controlling apparatus may have to be changed correspondingly. In other words, many troublesome engineering issues may arise from these additional pins.

SUMMARY OF THE INVENTION

Accordingly, the present invention is directed to a pulse width modulation (PWM) signal controlling apparatus, wherein a mode setting function is accomplished through a signal pin so that no additional pin for mode setting is required.

The present invention is directed to a power converter, wherein a mode setting function of a PWM signal controlling apparatus of the power converter is accomplished through a signal pin so that no additional pin for mode setting is required.

The present invention provides a PWM signal controlling apparatus including a signal pin, a core circuit, a setting judging circuit, a signal adjusting and selecting circuit, and a timer circuit. The signal pin is connected to a setting device, and which receives an external input signal. The setting judging circuit receives a setting signal and compares the setting signal with a reference value to generate a setting judgment result. The signal adjusting and selecting circuit is coupled to the signal pin. The signal adjusting and selecting circuit couples the signal pin to the setting judging circuit and adjusts the external input signal into the setting signal according to the setting device in a first state, and which couples the signal pin to the core circuit in a second state. The timer circuit is coupled to the signal adjusting and selecting circuit for controlling the state of the signal adjusting and selecting circuit, wherein the timer circuit sets the signal adjusting and selecting circuit in the first state during a predetermined time period.

According to an embodiment of the present invention, the setting judging circuit includes a comparator. The comparator receives the external input signal and the reference value and compares the setting signal with the reference value to generate the setting judgment result.

According to an embodiment of the present invention, the setting judging circuit further includes a latch. The latch is coupled to the comparator, and which latches the setting judgment result according to a latch signal.

According to an embodiment of the present invention, the timer circuit further generates the latch signal when the predetermined time period is reached.

According to an embodiment of the present invention, the setting judging circuit includes a first analog-to-digital converter (ADC) and a processor. The first ADC is coupled to the signal pin, and which receives and converts the analog setting signal into a digital setting signal. The processor receives the digital setting signal and compares the digital setting signal with the reference value to generate the setting judgment result.

According to an embodiment of the present invention, the setting judging circuit further includes a register. The register is coupled to the first ADC, and which latches the digital setting signal according to the latch signal.

According to an embodiment of the present invention, the PWM signal controlling apparatus further includes a second ADC. The second ADC is coupled to the processor, and which receives and converts an analog feedback signal into a digital feedback signal, wherein the feedback signal is at least one of a feedback voltage signal and a feedback current signal.

According to an embodiment of the present invention, the processor receives the digital feedback signal and generates a protection signal according to the digital feedback signal.

According to an embodiment of the present invention, the PWM signal controlling apparatus further includes a PWM signal generating circuit. The PWM signal generating circuit is coupled to the setting judging circuit, and which generates at least one PWM signal according to the setting judgment result and the protection signal.

According to an embodiment of the present invention, the signal adjusting and selecting circuit includes a current source, a first switch device, and a second switch device. The current source is coupled to the signal pin. The first switch device is connected between the current source and a reference voltage. The second switch device is connected between the core circuit and the signal pin. When the first switch device is turned on, the current source provides an adjusting current running through a reference resistor so as to adjust the external input signal into the setting signal.

The present invention also provides a power converter including at least one power converting circuit and a PWM signal controlling apparatus. The PWM signal controlling apparatus is coupled to the power converting circuit, and which generates at least one PWM signal for controlling a power converting operation of the power converting circuit. The PWM signal controlling apparatus includes a signal pin, a core circuit, a setting judging circuit, a signal adjusting and selecting circuit, and a timer circuit. The signal pin is connected to the setting device, and which receives an external input signal. The setting judging circuit receives a setting signal and compares the setting signal with a reference value to generate a setting judgment result. The signal adjusting and selecting circuit is coupled to the signal pin. The signal adjusting and selecting circuit couples the signal pin to the setting judging circuit and adjusts the external input signal into the setting signal according to the setting device in a first state, and which couples the signal pin to the core circuit in a second state. The timer circuit is coupled to the signal adjusting and selecting circuit for controlling the state of the signal adjusting and selecting circuit, wherein the timer circuit sets the signal adjusting and selecting circuit in the first state during a predetermined time period.

According to an embodiment of the present invention, the power converting circuit is a DC-DC power converting circuit, a DC-AC power converting circuit, or an AC-DC power converting circuit.

As described above, in the present invention, a timing process is executed by using a timer circuit according to the supply time of the operation power supply of the PWM signal controlling apparatus, and an external input signal is adjusted into a setting signal, so as to accomplish a mode setting function, by using a signal adjusting and selecting circuit according to the timing result. Thereby, the mode setting function is accomplished through a signal pin so that no additional pin is required and the surface area of the circuit is effectively reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
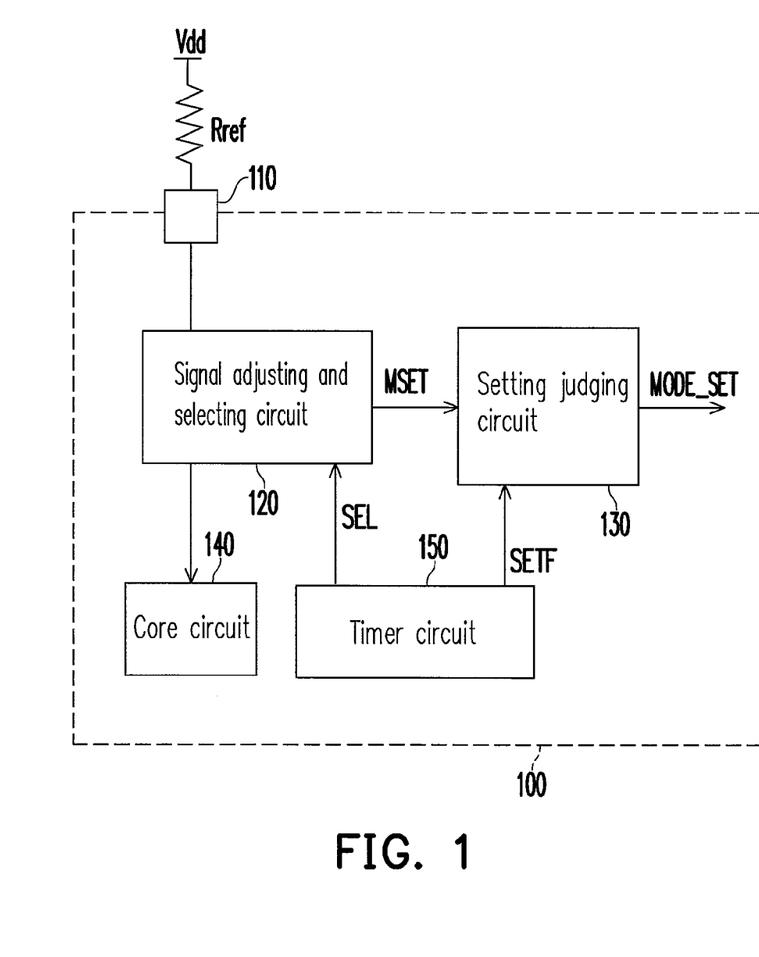
FIG. 1 is a diagram of a pulse width modulation (PWM) signal controlling apparatus 100 according to an embodiment of the present invention.

FIG. 1 is a diagram of a pulse width modulation (PWM) signal controlling apparatus 100 according to an embodiment of the present invention. Referring to FIG. 1, the PWM signal controlling apparatus 100 includes a signal pin 110, a signal adjusting and selecting circuit 120, a setting judging circuit 130, a core circuit 140, and a timer circuit 150. Taking a PWM signal controlling apparatus 100 in the form of an integrated circuit (IC) as an example, the PWM signal controlling apparatus 100 is connected to a setting device via the signal pin 110, and which receives a reference level signal through the setting device. In the present embodiment, the reference level signal is an external input signal Vdd.

The signal adjusting and selecting circuit 120 is coupled to the signal pin 110. According to a select signal SEL, the signal adjusting and selecting circuit 120 couples the signal pin 110 to the core circuit 140 or adjusts the external input signal Vdd into a setting signal MSET and couples the signal pin 110 to the setting judging circuit 130.

To be specific, the signal adjusting and selecting circuit 120 performs adjusting and coupling operations on the external input signal Vdd according to the select signal SEL. For example, when the select signal SEL is at a first level (for example, the logic low level "0"), the signal adjusting and selecting circuit 120 is in a first state, and it adjusts the external input signal Vdd into the setting signal MSET at another voltage level. Besides, the signal adjusting and selecting circuit 120 couples the signal pin 110 to the setting judging circuit 130 to transmit the setting signal MSET to the setting judging circuit 130. It should be noted herein that the setting signal MSET is set according to an electrical characteristic of the setting device. In the present embodiment, the setting device is a reference resistor Rref, and accordingly, the setting signal MSET is set according to the resistance of the reference resistor Rref. In other embodiments, the setting device may also be a capacitor or a diode. Namely, a user can change the setting signal MSET (and accordingly set the mode of the PWM signal controlling apparatus 100) by changing an electrical characteristic of the external setting device, such as the resistance of the reference resistor Rref.

In addition, when the select signal SEL is at a second level (for example, the logic high level "1"), the signal adjusting and selecting circuit 120 is in a second state, and it couples the signal pin 110 to the core circuit 140 so that the core circuit 140 can operate appropriately according to the external input signal Vdd. In the present embodiment, the core circuit 140 may be a "power good" control circuit. Namely, the core circuit 140 determines whether an output voltage of a converting circuit (not shown) controlled by the PWM signal controlling apparatus 100 has approached or risen to a stable level, so as to determine whether a power good signal is to be generated to notify other circuits to start their operations.

The select signal SEL is generated by the timer circuit 150. The timer circuit 150 starts a timing process according to the supplying time point of the operation power supply (in the present embodiment, the operation power supply is equivalent to the external input signal Vdd) of the PWM signal controlling apparatus 100. During the time period, starting from the supplying time point, within a predetermined time period, the timer circuit 150 generates the select signal SEL such that the signal adjusting and selecting circuit 120 couples the signal pin 110 to the setting judging circuit 130 to transmit the setting signal MSET to the setting judging circuit 130. Contrarily, when the time period is longer than or equal to the predetermined time period, the timer circuit 150 changes the select signal SEL thereof such that the signal adjusting and selecting circuit 120 couples the signal pin 110 to the core circuit 140 for directly conducting the external input signal Vdd to the core circuit 140.

To be more specific, when the operation power supply of the PWM signal controlling apparatus 100 just rises to a stable state, the PWM signal controlling apparatus 100 starts to operate. Since the PWM signal controlling apparatus 100 is in a mode setting stage, the converting circuit controlled by the PWM signal controlling apparatus 100 is not started to operate. Thus, the output voltage of the converting circuit is not reached a predetermined voltage level, and the core circuit 140 needs not to take any action. Herein, the signal adjusting and selecting circuit 120 transmits the setting signal MSET to the setting judging circuit 130, and the setting judging circuit 130 performs a comparison operation with respect to the setting signal MSET and a reference value. After the predetermined time period is over, the timer circuit 150 allows the setting judging circuit 130 to output a mode setting signal MODE_SET. Meanwhile, the converting circuit controlled by the PWM signal controlling apparatus 100 starts to operate, and the signal adjusting and selecting circuit 120 directly conducts the external input signal Vdd to the core circuit 140 so that the core circuit 140 can start to determine the state of the output voltage. Accordingly, the setting of the mode of the PWM signal controlling apparatus 100 and the original operation of the core circuit 140 can be accomplished through a single signal pin 110, so that no additional pin is to be disposed.

Herein the setting judging circuit 130 performs the comparison operation by comparing the setting signal MSET with the reference value. When the reference value has only one value, the setting judging circuit 130 obtains a setting judgment result MODE_SET for setting two modes (for example, the setting judgment result MODE_SET is a one-bit signal) through this comparison operation. However, when the reference value contains multiple values, the setting judging circuit 130 obtains a setting judgment result MODE_SET for setting more modes (for example, the setting judgment result MODE_SET is a multi-bit signal) through this comparison operation. Accordingly, the PWM signal controlling apparatus 100 determines its operation mode among a plurality of operation modes according to the setting judgment result MODE_SET.

This will be explained with reference to an actual example. If the reference value has a single value V1, the setting judging circuit 130 obtains a setting judgment result MODE_SET for setting two modes by determining whether the setting signal MSET is greater than the value V1. If the reference value contains two different values V1 and V2 and the value V1 is greater than the value V2, the setting judging circuit 130 obtains a setting judgment result MODE_SET for setting three modes by determining whether the setting signal MSET is greater than the value V1, between the value V1 and the value V2, or smaller than the value V2.

It should be mentioned that in order to stabilize the setting judgment result MODE_SET generated by the setting judging circuit 130, the timer circuit 150 further generates a latch signal SETF when it determines that a predetermined time period is reached. The timer circuit 150 transmits the latch signal SETF to the setting judging circuit 130, and the setting judging circuit 130 latches the setting judgment result MODE_SET according to the latch signal SETF.

Figure 2A:
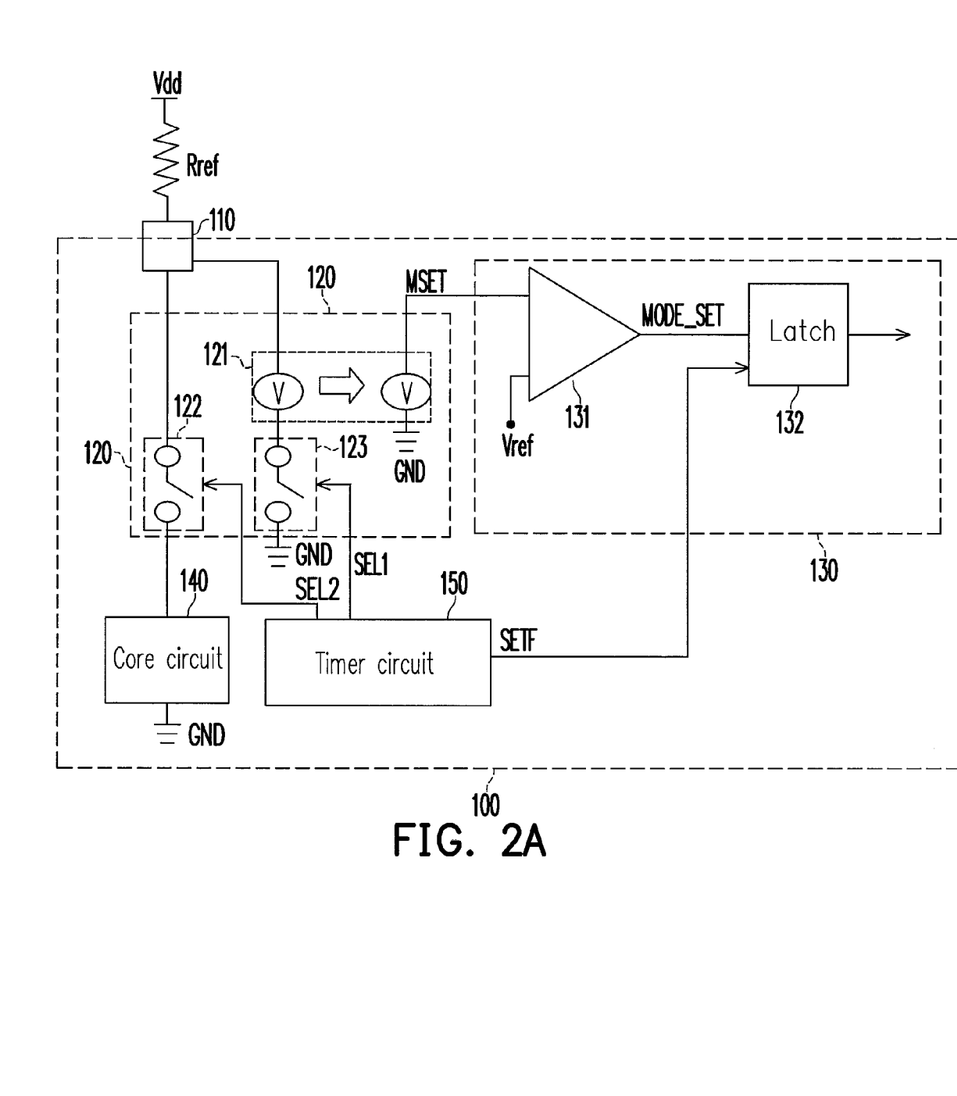
FIG. 2A is a diagram illustrating an embodiment of the PWM signal controlling apparatus 100.

FIG. 2A is a diagram illustrating an embodiment of the PWM signal controlling apparatus 100. Referring to FIG. 2A, the signal adjusting and selecting circuit 120 includes a voltage coupling device 121 and switch devices 122 and 123. The voltage coupling device 121 is coupled to the signal pin 110 to receive the external input signal Vdd. The switch device 123 is connected between the voltage coupling device 121 and a reference voltage GND and is controlled by the select signal SEL1. The switch device 122 is connected between the core circuit 140 and the signal pin 110 and is controlled by the select signal SEL2. When the switch device 123 is turned on, the voltage coupling device 121 is coupled to the voltage on the signal pin 110 to generate the setting signal MSET. Besides, the switch devices 123 and 122 are not turned off at the same time. During the configuration stage, the switch device 122 and the switch device 123 in their initial states are both turned on. Then, the switch device 122 is turned off, which means the PWM signal controlling apparatus 100 is performing a mode setting operation. Contrarily, after the PWM signal controlling apparatus 100 finishes the mode setting operation, the switch device 122 is turned on to conduct the external input signal Vdd to the core circuit 140. Thereafter, the switch device 123 is turned off.

The setting judging circuit 130 includes a comparator 131 and a latch 132. The comparator 131 receives the setting signal MSET and a reference value Vref and compares the setting signal MSET with the reference value Vref to generate a setting judgment result MODE_SET. The latch 132 is coupled to the comparator 131, and which latches the setting judgment result MODE_SET according to the latch signal SETF.

Figure 2B:
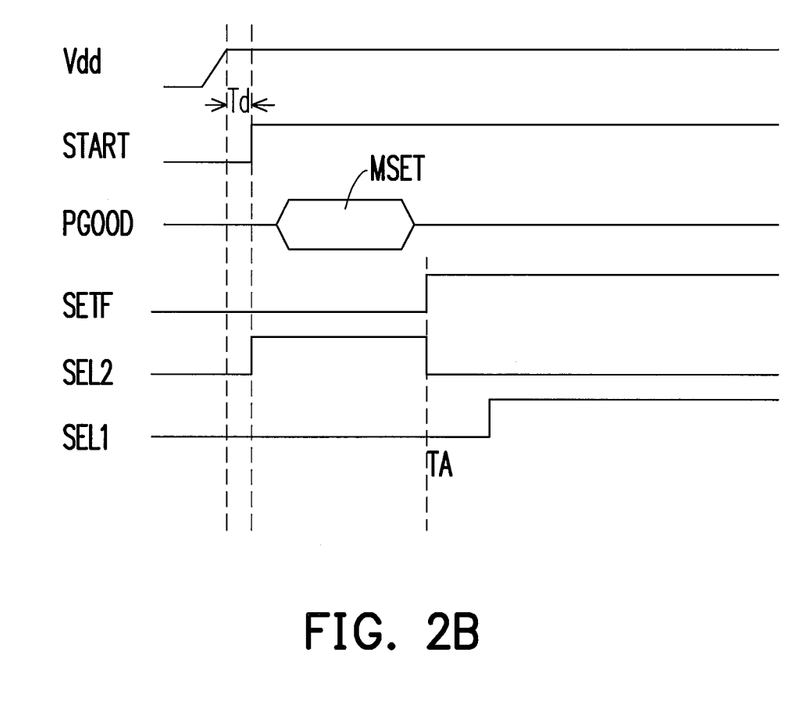
FIG. 2B is an operation waveform of the embodiment in FIG. 2A.

FIG. 2B is an operation waveform of the embodiment in FIG. 2A. Referring to both FIG. 2A and FIG. 2B, after the external input signal Vdd is stabilized and provided to the signal pin 110 and a delay time Td elapses, the timer circuit 150 starts a timing process according to a starting flag START. Herein since the predetermined time period is not reached yet, the voltage PGOOD on the signal pin 110 is adjusted into the setting signal MSET. Meanwhile, the timer circuit 150 generates a logic-high select signal SEL2 to turn off the switch device 122 and couple the setting signal MSET to the comparator 131 so that the setting signal MSET is compared with the reference value Vref and the setting judgment result MODE_SET is generated. When the timer circuit 150 determines that the predetermined time period is reached (i.e., at a threshold time point TA), the timer circuit 150 generates the latch signal SETF to latch the setting judgment result MODE_SET and generates a logic-low select signal SEL2 to turn on the switch device 122. Thereafter, the timer circuit 150 further generates a logic-high select signal SEL1 to turn off the switch device 123 so that the external input signal Vdd is directly conducted to the core circuit 140.

Figure 3:
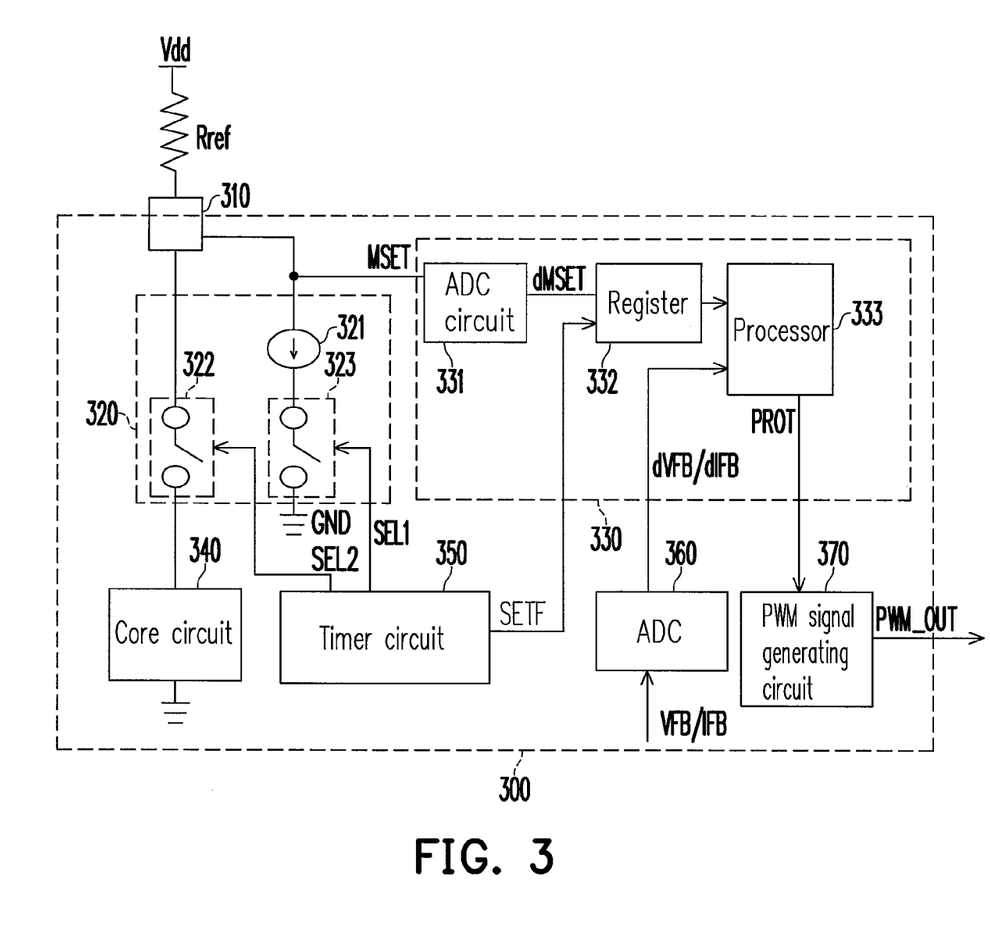
FIG. 3 is a diagram of a PWM signal controlling apparatus 300 according to another embodiment of the present invention.

FIG. 3 is a diagram of a PWM signal controlling apparatus 300 according to another embodiment of the present invention. Referring to FIG. 3, besides the signal pin 310, the signal adjusting and selecting circuit 320, the setting judging circuit 330, the core circuit 340, and the timer circuit 350, the PWM signal controlling apparatus 300 further includes an analog-to-digital converter (ADC) 360 and a PWM signal generating circuit 370.

Unlike that in the embodiment illustrated in FIG. 2A, the setting judging circuit 330 in the present embodiment includes an ADC circuit 331, a register 332, and a processor 333. The ADC circuit 331 is coupled to the signal pin 310 to receive and convert an analog setting signal MSET into a digital setting signal dMSET. The register 332 is coupled to the ADC circuit 331 to receive the digital setting signal dMSET. The register 332 is also coupled to the timer circuit 350 and latches the digital setting signal dMSET when receiving the latch signal SETF.

The processor 333 is coupled to the register 332 to receive the digital setting signal dMSET latched by the register 332. The processor 333 is also coupled to the ADC circuit 360 and the PWM signal generating circuit 370. The ADC circuit 360 receives an analog feedback signal, wherein the feedback signal is at least one of a feedback voltage signal VFB and a feedback current signal IFB. Herein the feedback voltage signal VFB and the feedback current signal IFB are voltage and current detecting signals sent back from the output terminal of a power converter (not shown) adopted by the PWM signal controlling apparatus 300.

The ADC circuit 360 converts at least one of the received feedback voltage signal VFB and feedback current signal IFB into a digital feedback voltage signal dVFB and a digital feedback current signal dIFB. The processor 333 receives at least one of the digital feedback voltage signal dVFB and the feedback current signal dIFB and compares it with the setting signal dMSET, so as to determine whether a voltage or current abnormality occurs in the power converter. Herein, the voltage abnormality may be over voltage or under voltage, and the current abnormality may be over current or under current.

This will be explained with reference to a simple example. Under voltage occurs when the processor 333 determines that the setting signal dMSET is greater than the feedback voltage dVFB, over voltage occurs when the processor 333 determines that the setting signal dMSET is smaller than the feedback voltage dVFB, under current occurs when the processor 333 determines that the setting signal dMSET is greater than the feedback current dIFB, and over current occurs when the processor 333 determines that the setting signal dMSET is smaller than the feedback current dIFB.

The processor 333 further generates a protection signal PROT according to foregoing determination result, and the PWM signal generating circuit 370 enters a protection mode and stops outputting a PWM signal PWM_OUT when it receives the protection signal PROT from the processor 333.

Additionally, the signal adjusting and selecting circuit 320 in the present embodiment includes a current source 321 and switch devices 322 and 323. During the configuration stage, both the select signals SEL1 and SEL2 are considered being at a logic low level by default. When the timing process of the timer circuit 350 is not reached the predetermined time period yet, the timer circuit 350 provides the select signal SEL2 to turn off the switch device 322 (meanwhile, the select signal SEL1 is considered being at the logic low level by default, so as to turn on the switch device 323). At the same time, the current source 321 provides an adjusting current flowing through the reference resistor Rref, so as to adjust the external input signal Vdd into the setting signal MSET. In other words, the setting signal MSET is set according to the resistance of the reference resistor Rref. When the timer circuit 350 determines that the predetermined time period is reached, the timer circuit 350 provides the select signal SEL2 to turn on the switch device 322. After that, the timer circuit 350 provides the select signal SEL1 to turn off the switch device 323 and cut off the path for the current source 321 to supply the adjusting current, and the timer circuit 350 then transmits the external input signal Vdd to the core circuit 340 to carry out normal operations.

Figure 4A:
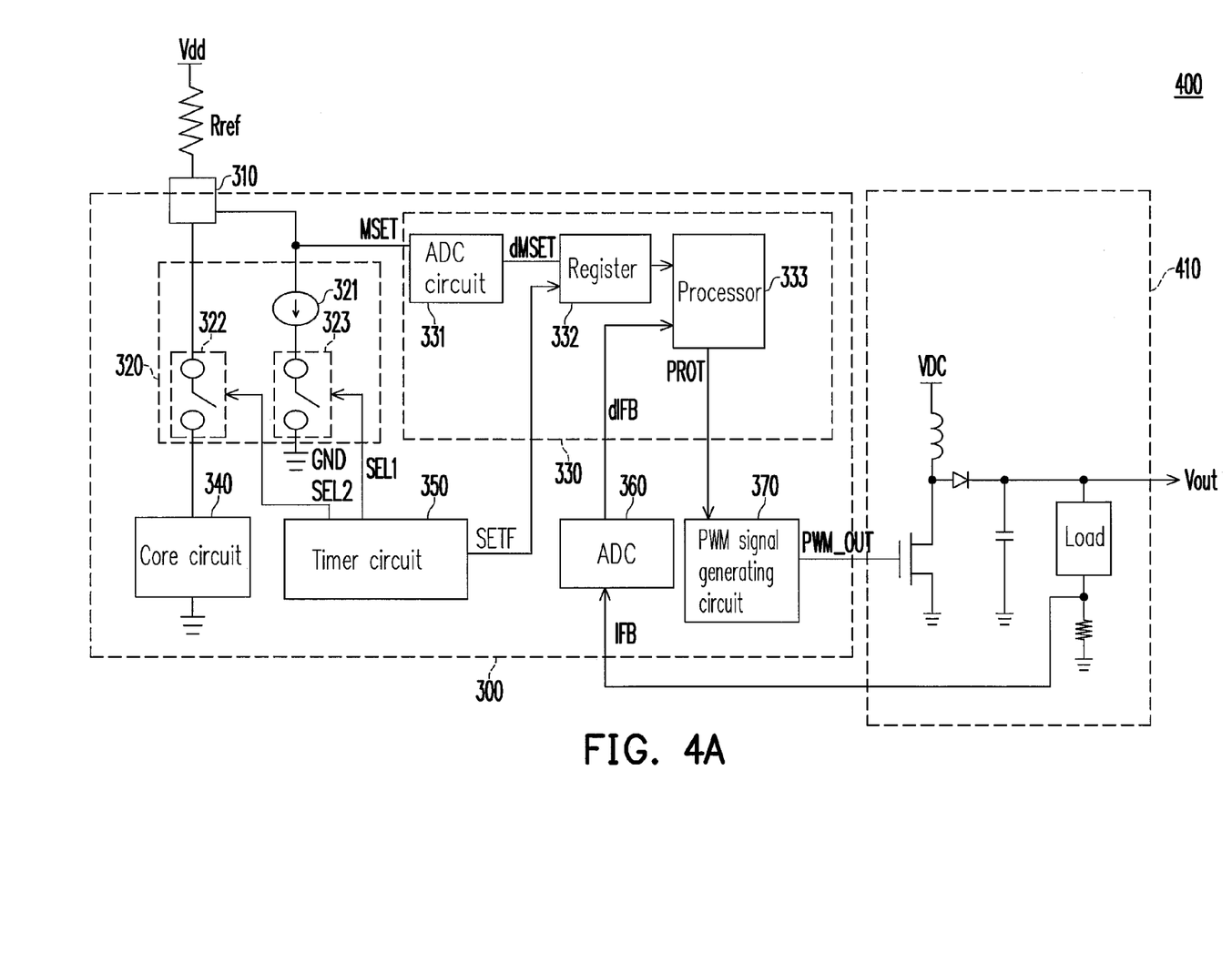
FIGS. 4A-4C are respectively a diagram of a power converter 400 according to three embodiments of the present invention.
Figure 4B:
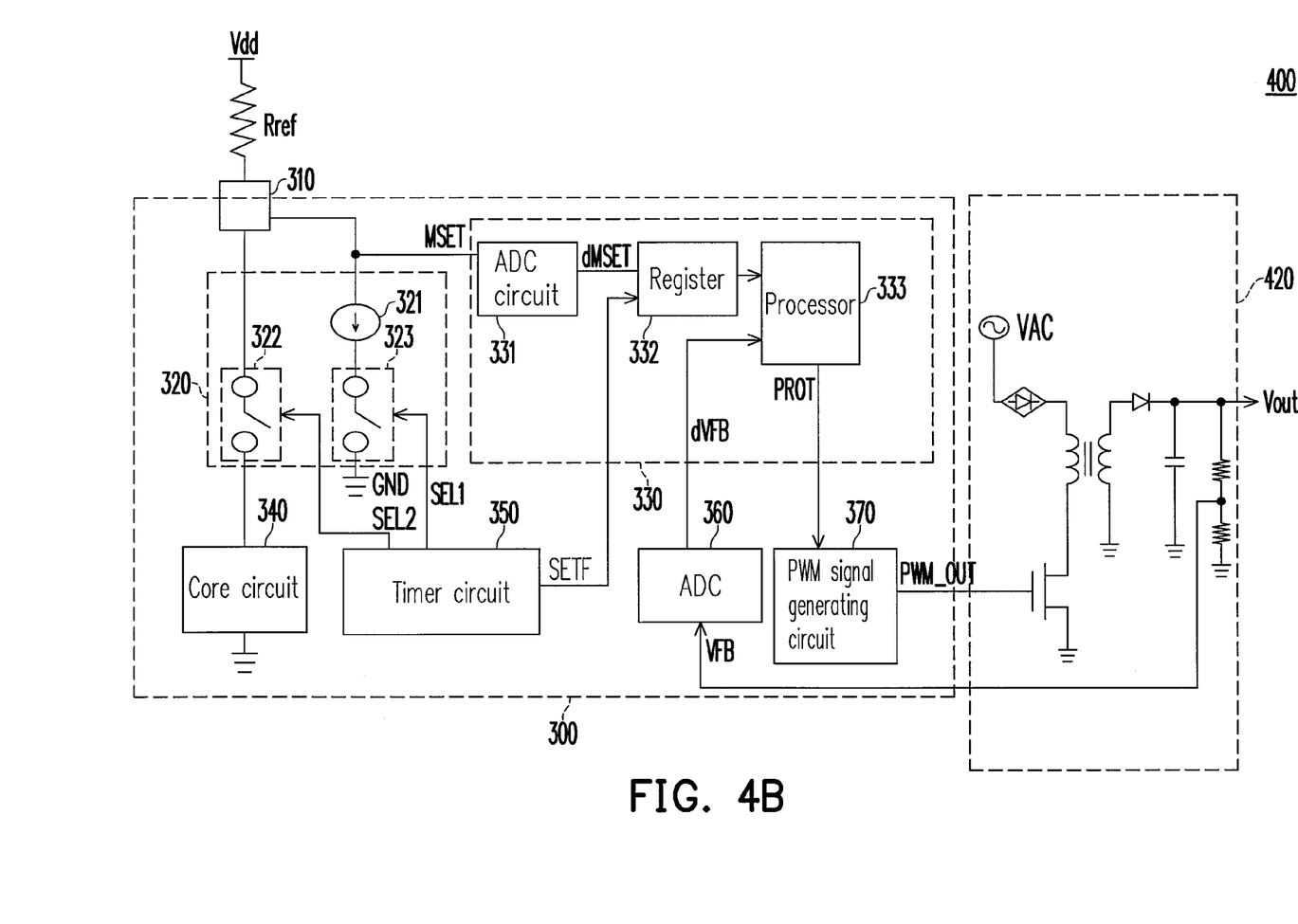
Figure 4C:
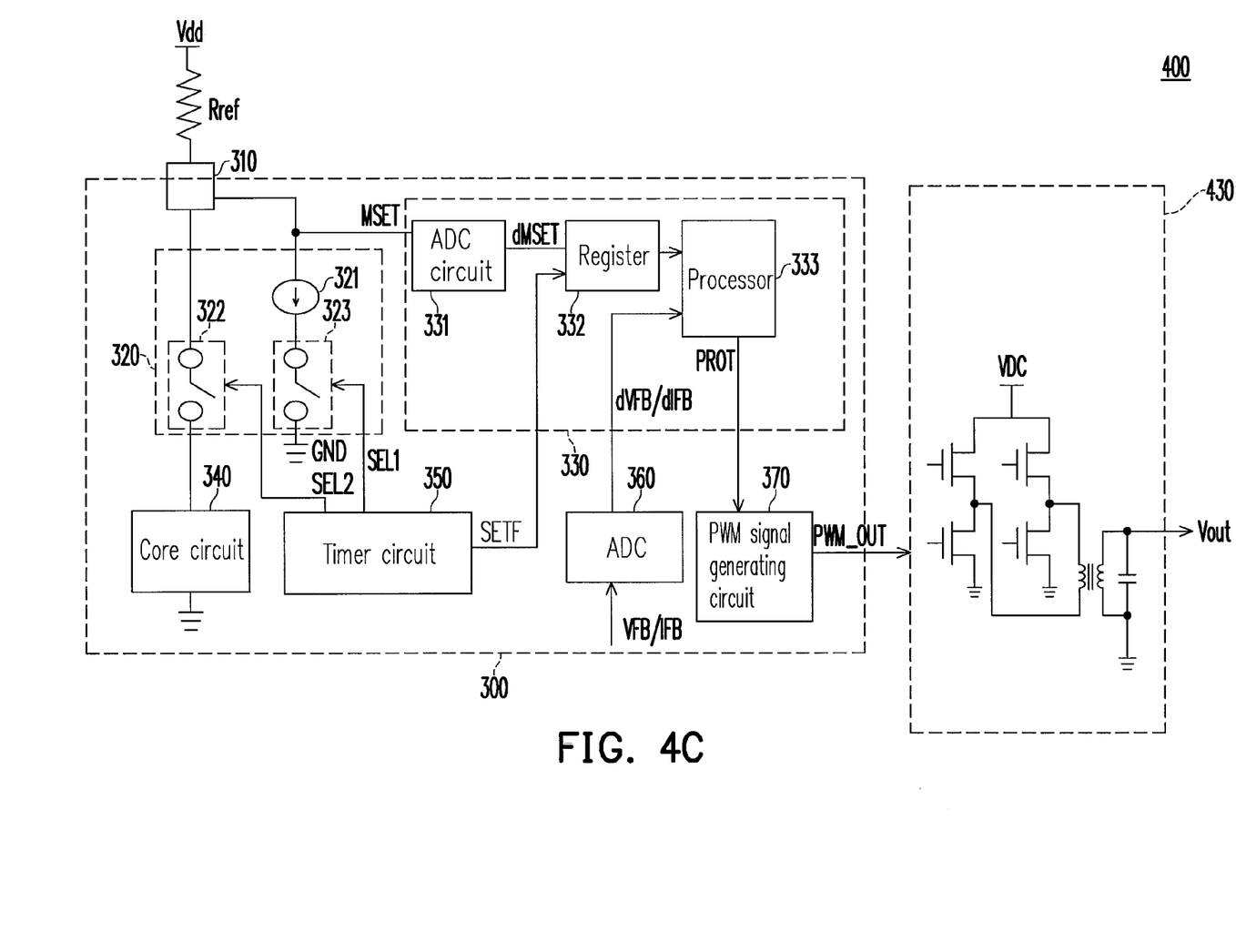

FIGS. 4A-4C are respectively a diagram of a power converter 400 according to three embodiments of the present invention. Referring to FIG. 4A, the power converter 400 includes a power converting circuit 410 and a PWM signal controlling apparatus 300. The PWM signal controlling apparatus 300 is the embodiment illustrated in FIG. 3. The power converting circuit 410 is coupled to the PWM signal controlling apparatus 300 to receive the PWM signal PWM_OUT generated by the PWM signal controlling apparatus 300. The power converting circuit 410 is a DC-DC power converting circuit, and which receives a DC voltage VDC and converts the DC voltage VDC according to the PWM signal PWM_OUT to generate a DC output voltage Vout.

Herein the PWM signal controlling apparatus 300 may be replaced by the PWM signal controlling apparatus 200 illustrated in FIG. 2A, and the DC-DC power converting circuit 410 illustrated in FIG. 4A may be replaced by another type of DC-DC power converter.

The power converter 400 illustrated in FIG. 4B includes a power converting circuit 420 and a PWM signal controlling apparatus 300. The power converting circuit 420 is coupled to the PWM signal controlling apparatus 300 to receive the PWM signal PWM_OUT generated by the PWM signal controlling apparatus 300. The power converting circuit 420 is an AC-DC power converter, and which receives an AC voltage VAC and converts the AC voltage VAC according to the PWM signal PWM_OUT to generate a DC output voltage Vout.

The PWM signal controlling apparatus 300 illustrated in FIG. 4B may also be replaced by the PWM signal controlling apparatus 200 in FIG. 2A, and the AC-DC power converting 420 thereof may be replaced by another type of AC-DC power converter.

The power converter 400 in FIG. 4C includes a power converting circuit 430 and a PWM signal controlling apparatus 300. The power converting circuit 430 is coupled to the PWM signal controlling apparatus 300 to receive the PWM signal PWM_OUT generated by the PWM signal controlling apparatus 300. The power converting circuit 430 is a DC-AC power converter, and which receives a DC voltage VDC and converts the DC voltage VDC according to the PWM signal PWM_OUT to generate an AC output voltage Vout.

Similarly, the PWM signal controlling apparatus 300 in FIG. 4C may be replaced by the PWM signal controlling apparatus 200 in FIG. 2A, and the DC-AC power converting circuit 430 thereof may be replaced by another type of DC-AC power converting circuit.

In summary, according to the present invention, a timing process is performed by a timer such that a signal pin can respectively receive an external input signal and a setting signal at different time periods, and a mode setting operation is accomplished when the signal pin receives the setting signal. After the mode setting operation is accomplished, the original operation of a core circuit connected to the signal pin is resumed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pulse width modulation (PWM) signal controlling apparatus, comprising:
   a signal pin, connected to a setting device, for receiving an external input signal;
   a core circuit, coupled to the signal pin;
   a setting judging circuit, receiving a setting signal and comparing the setting signal with a reference value to generate a setting judgment result;
   a signal adjusting and selecting circuit, coupled to the signal pin, for coupling the signal pin to the setting judging circuit and adjusting the external input signal into the setting signal according to the setting device in a first state, and for coupling the signal pin to the core circuit in a second state; and
   a timer circuit, coupled to the signal adjusting and selecting circuit, for controlling a state of the signal adjusting and selecting circuit, wherein the timer circuit sets the signal adjusting and selecting circuit in the first state during a predetermined time period.

2. The PWM signal controlling apparatus according to claim 1, wherein the setting judging circuit comprises:
   a comparator, receiving the setting signal and the reference value, and comparing the setting signal with the reference value to generate the setting judgment result.

3. The PWM signal controlling apparatus according to claim 2, wherein the setting judging circuit further comprises:
   a latch, coupled to the comparator, wherein the timer circuit generates a latch signal when the signal adjusting and selecting circuit is in the first state, for latching the setting judgment result.

4. The PWM signal controlling apparatus according to claim 1, wherein the setting judging circuit comprises:
   a first analog-to-digital converter (ADC), coupled to the signal pin, for receiving and converting the analog setting signal into a digital setting signal;
   a processor, receiving the digital setting signal and comparing the digital setting signal with the reference value to generate the setting judgment result; and
   a register, coupled to the first ADC, for latching the digital setting signal according to a latch signal.

5. The PWM signal controlling apparatus according to claim 4 further comprising:
   a second ADC, coupled to the processor, for receiving an analog feedback signal and converting the analog feedback signal into a digital feedback signal, wherein the feedback signal is at least one of a feedback voltage signal and a feedback current signal, and the processor receives the digital feedback signal and generates a protection signal according to the digital feedback signal.

6. The PWM signal controlling apparatus according to claim 5 further comprising:
   a PWM signal generating circuit, coupled to the setting judging circuit, for determining whether to generate at least one PWM signal according to the protection signal.

7. The PWM signal controlling apparatus according to claim 1, wherein the signal adjusting and selecting circuit comprises:
   a first switch device, coupled between the signal pin and a reference voltage; and
   a second switch device, coupled between the core circuit and the signal pin.

8. The PWM signal controlling apparatus according to claim 1, wherein the setting device is a resistor.

9. A power converter, comprising:
   at least one power converting circuit; and
   a PWM signal controlling apparatus, coupled to the power converting circuit, for generating at least one PWM signal to control a power converting operation of the power converting circuit, the PWM signal controlling apparatus comprising:
   a signal pin, connected to a setting device, for receiving an external input signal;
   a core circuit, coupled to the signal pin;
   a setting judging circuit, receiving a setting signal and comparing the setting signal with a reference value to generate a setting judgment result;
   a signal adjusting and selecting circuit, coupled to the signal pin, for coupling the signal pin to the setting judging circuit and adjusting the external input signal into the setting signal according to the setting device in a first state, and for coupling the signal pin to the core circuit in a second stat; and
   a timer circuit, coupled to the signal adjusting and selecting circuit, for controlling a state of the signal adjusting and selecting circuit, wherein the timer circuit sets the signal adjusting and selecting circuit in the first state during a predetermined time period.

10. The power converter according to claim 9, wherein the PWM signal controlling apparatus has a plurality of operation modes, and the PWM signal controlling apparatus operates in the corresponding operation mode according to the setting judgment result.

11. The power converter according to claim 9, wherein the PWM signal controlling apparatus receives a feedback signal and determines whether to stop generating the PWM signal according to the feedback signal and the setting judgment result.

12. The power converter according to claim 11, wherein the power converting circuit is a DC-DC power converting circuit, a DC-AC power converting circuit, or an AC-DC power converting circuit.

* * * * *